United States Patent [19]

Janz

[11] 4,364,685

[45] Dec. 21, 1982

[54] DEVICE FOR ATTACHING AN INSERTION PART TO A BASE SURFACE

[75] Inventor: Joachim Janz, Wuppertal, Fed. Rep. of Germany

[73] Assignee: Gebr. Happich GmbH, Fed. Rep. of Germany

[21] Appl. No.: 181,801

[22] Filed: Aug. 27, 1980

[30] Foreign Application Priority Data

Aug. 29, 1979 [DE] Fed. Rep. of Germany ....... 2934788

[51] Int. Cl.³ .......................... F16B 7/00; F16D 1/12
[52] U.S. Cl. .................................... 403/108; 403/321; 403/355
[58] Field of Search ............... 403/247, 321, 328, 348, 403/355, 107, 108; 285/334, 333, 307

[56] References Cited

U.S. PATENT DOCUMENTS

| 3,647,242 | 3/1972 | Pawsat et al. | 403/107 X |
| 3,679,244 | 7/1972 | Reddy | 403/328 X |
| 3,832,075 | 8/1974 | Arai | 403/328 |
| 4,274,754 | 6/1981 | Cohen | 403/14 |

FOREIGN PATENT DOCUMENTS

| 2531368 | 3/1977 | Fed. Rep. of Germany . |
| 1231735 | 10/1960 | France . |
| 1544628 | 9/1968 | France . |
| 2261898 | 9/1975 | France . |
| 2361245 | 3/1978 | France . |
| 2368629 | 10/1978 | France . |

*Primary Examiner*—Wayne L. Shedd
*Attorney, Agent, or Firm*—Ostrolenk, Faber, Gerb & Soffen

[57] ABSTRACT

A device for attaching an article, such as an armrest, a hand grip, etc., to a base surface is disclosed. The device comprises an attachment clip and an insert which is receivable in an aperture in the clip. The clip is secured in an opening in the base surface. A dentate structure is provided either on the insert or in the attachment clip, and a locking device is provided on the other of the insert or the clip to engage the dentate structure, thereby to secure the attachment clip and the insert together. The locking device preferably is a suitably shaped spring. The insert is either tubular in shape, or a longitudinal segment of a tube. Rotation of the insert to one orientation disengages the dentate structure and the locking device, enabling insertion and removal of the insert. Rotation of the insert to another orientation engages the dentate structure and the locking device for locking the insert against longitudinal shifting.

24 Claims, 4 Drawing Figures

DEVICE FOR ATTACHING AN INSERTION PART TO A BASE SURFACE

BACKGROUND OF THE INVENTION

The present invention relates to a device for attaching an insertion part, such as an armrest or a hand grip, to a base surface, for example, a surface within the body of a vehicle. In particular, the invention relates to an attachment device of the type in which one part of the attachment is the free end of an armrest or hand grip insert, or the like, and the other part is a clip contained in the wall of the body to which the aforesaid free end is to be secured. The two parts are locked together in a first relative rotative position and are detachable by means of rotating them relative to each other from the locking position.

For armrests and hand grips, it is known to develop the free end of an insert as a part of an attachment device for cooperating with another attachment part, such as an attachment clip contained in the wall of the body to which the insert is to be secured. Known devices of this type can be used when only very little if any padding covers the body wall. In such devices, run-on inclines are formed which, in the manner of a bayonet socket and coupling, pull each attachment part against the other. Such an attachment can be used only in the relatively few vehicles which do not have significant padding. There is still another disadvantage in that manufacturing tolerances and materials tolerances may be so unfavorable that the tightening means (the run-on incline) is not sufficient to achieve a satisfactory wobble-free attachment.

Since it is particularly important in the case of armrests and hand grips to secure them in a wobble-free manner, it is also necessary to adapt the attachment clip so that the inserted attachment device is held securely in all directions. Otherwise, the connection can loosen and the attached parts can separate as a result of the constantly recurring different stresses acting on them in every direction. With an unsuitable design of the inserted attachment part, for instance in the case of a part having a rectangular cross-section, the attachment part may break after a period of time due to the stresses on it in use.

Interlocking structures, especially for attaching armrests to a body, are known. Such structures are known, however, only in attachment devices which include an insert whose cross-section is, for instance, circular or rectangular. In each of these cases, the interlocking structure is associated with the free outer edge of the armrest.

In addition to the requirement of maintaining a secure and permanent attachment after installation, the attachment parts must be such that they can be attached without damage to them or to the neighboring regions of the body to which they are secured. The aforementioned cross-sectional shapes cannot be received in an even approximately form-locked manner if these requirements are to be met. Form-locking, however, is essential for wobble-free attachment. If only for this reason, the known devices employing interlocking structures could not pass beyond the preliminary experimental stage.

SUMMARY OF THE INVENTION

The object of the invention is to provide an attachment device for securing an attachment part to a base surface, which device is simple in construction, and includes an insert portion that can be inserted to any required depth, that is securely supported on all sides by the mating structural part, and that is itself of sufficiently high static strength.

In accordance with the invention, one part of the attachment device is the free end of an armrest or hand grip or the like, which is developed to be received in an attachment clip secured to the base surface. The insert portion is developed as a tube or a longitudinal segment of a tube (i.e. a portion of a cylindrical shell or the like, having a cross-section that is a generally circular arc), the outer cylindrical surface of which is received in a form-locked manner in an opening in the attachment clip. A dentate structure is provided on either the insert portion or the clip to provide the desired form-lock attachment. The tube may have a longitudinal slot formed therein. If the insert is a segment of a tube, its cross-section preferably has a circumferential arc length subtending at least 180°.

As noted above, the use of an interlocking structure has heretofore been found impracticable. When the insert portion is developed as a tube or as a longitudinal segment of a tube, however, the above-described disadvantages encountered conventionally with a dentate locking structure do not occur. The insert portion of the invention, can be received in its entirety in a form-locked manner by the attachment clip, except for the dentate structure, a part of which will in some embodiments remain outside the aperture in the attachment clip. The insert portion has high structural strength and is formed in a simple manner. In the case where the insert portion is a complete tube, it is sufficient for the outer cylindrical surface thereof alone to be engaged in form-locked manner in an aperture in the attachment clip. In the case where the insert portion is a longitudinal segment of a tube, the attachment clip will preferably be developed to engage the inner cylindrical surface of the tube segment in form-locked manner also. To this end, the aperture in the attachment clip is profiled to engage the longitudinal tube segment. Despite the very high quality of the attachment that is obtained with the device of the invention, its cost is lower than that of the prior art.

In one embodiment, in order for the dentate structure not to weaken the tube or tubular segment excessively, the dentate structure comprises serrations which extend along only a portion of the length of the free end of the insert portion. The serrations cover only a part of the circumference of the surface of the insert portion and do not extend to the side edges thereof (in the case of an insert portion which is a longitudinal segment of a tube). This structure is decisive for maintaining the stability of the tube or tube segment. If especially precisely shaped serrations are required, they must be formed by means of a cutting operation. But, it appears to be satisfactory in general to emboss the serrations or to form them by means of an impact tool.

The generally circular cross-section of the insert can be modified in various ways. One such modification in cross-section comprises wing-like protrusions on the longitudinal edges of the tube segment which project in approximately a radial direction. A second modification is a doubling-over of the material of the insert, particularly at an edge. This can, for example, be done at the end of the tube or along the wing-like protruding edges of the tube or tube segment. The dentate structure may comprise serrations formed on the cylindrical surface of the insert portion or may comprise teeth formed in the double-over edge. Even with such modifications, the advantages that result from the insert portion being a tube or a longitudinal segment of a tube, which is the essence of the invention, are retained in full.

The aperture in the attachment clip which receives the free end of the insert portion is designed such that the insert portion can be rotated therein. The dentate structure is so designed that it is brought into or out of engagement with a locking device by rotation of the insert portion in the aperture. The insert portion is inserted into the aperture with such an orientation that the dentate structure and locking device are not engaged, and is then rotated to effect such engagement, locking the insert portion to the attachment clip. Conversely, to detach the insert portion, it is rotated in the aperture to disengage the dentate structure. The insert portion is then removed from the aperture.

The dentate structure, as noted, can be disposed either on the insert portion, such as the tube or tube segment, or on the holding clip. In the latter case, a locking tab, or the like, is provided on the insert to engage the teeth of the dentate structure. It is also possible to use a conventional engagement device. For example, cooperating conventional interlocking structures could be provided on both the insert portion and the clip and would be adapted in form-locked manner to each other.

In attachments of armrests and hand grips known at the present time, the depth of insertion of the insert portion bearing the dentate structure is limited by the thickness of the padding layer on the body wall. Safety in the vehicle is, however, improved by the padding, in that the armrests and hand grips are at least partially pressed into the padding in the event of a collison so that the distance they protrude from the inner wall of the body decreases. This protection is also provided, at least in part, by the device of the invention. If the insert portion and the dentate structure are designed so that the insert portion is prevented by the padding layer on the body wall from being inserted to its full depth upon installation, the attached armrest or the like will, if hit by the body of a passenger in the vehicle, yield to the blow by being forced farther into the attachment clip against the resistance of the padding.

If the attachment clip is, as is usual, a plastic member, which may be injection molded and which is substantially less stable mechanically than an insert portion made of metal, it is preferable that the structure in the attachment clip which engages the dentate structure (where the dentate structure is disposed on the insert portion) be a locking spring which is held in an aperture or slot formed in the attachment clip.

Other objects and features of the invention will be apparent from the following description and the accompanying drawings.

DESCRIPTION OF THE PREFERRED EMBODIMENTS

Figure 1:
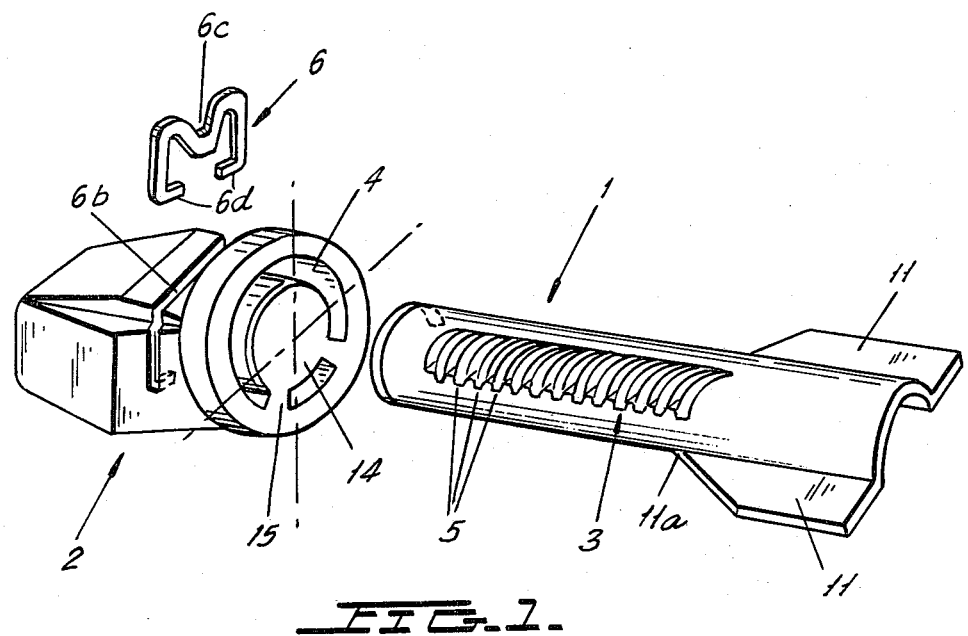
FIGS. 1 and 2 respectively show an exploded perspective view and a cross-sectional view of one embodiment of an attachment device according to the invention.

In the embodiment shown in FIGS. 1 and 2, the free end of an armrest or handgrip insert 1, hereinafter referred to simply as the insert 1, is developed as a part to be attached to a wall or the like. The insert 1 is developed toward its free end as a half-tube, i.e. as a longitudinal portion of a cylindrical shell having a cross-section that is a circular arc. A side wing 11 is provided along each longitudinal edge of the insert 1 and extends along at least a portion of the length thereof to a point 11a short of the free end thereof.

An attachment clip 2 is received in a wall 7 (see FIG. 2) of the body to which the insert 1 is to be secured. The clip 2 has an arcuate aperture 4 formed in it for receiving the free end of the insert 1. Attachment clip 2 includes a central plug 14 which defines the inner edge of the aperture 4 so that the free end of insert 1 is received in the aperture in form-locked manner, as will be described below. The circumferential length of the aperture 4 is greater than the arc length of the curved edge of the free end of the insert 1, so that the insert 1 can be rotated in aperture 4 to detach it from clip 2, as will be described below.

Figure 2:
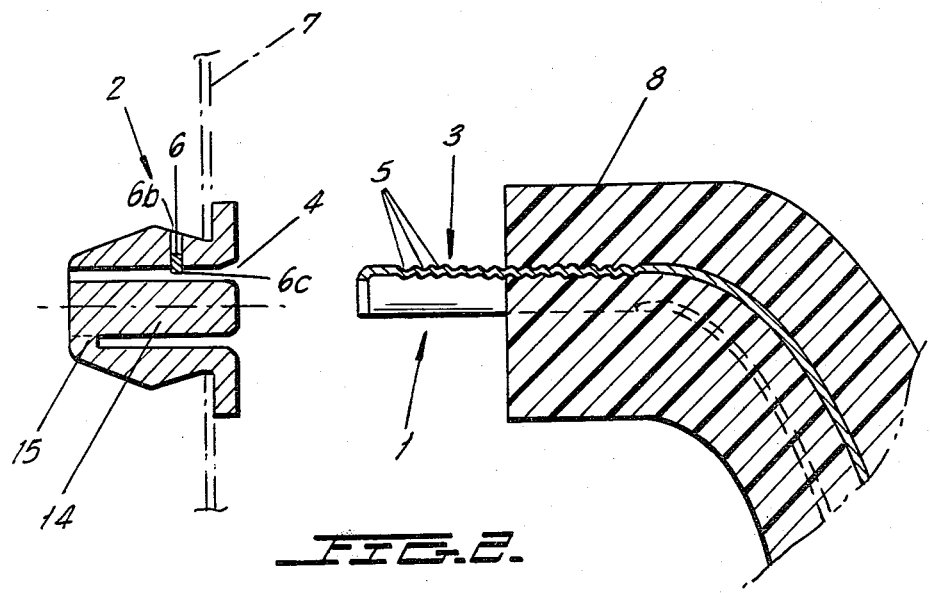

The means by which the insert 1 is form-locked in aperture 4 includes a dentate structure 3, which in the embodiment of FIGS. 1 and 2 comprises a plurality of serrations or teeth 5 which extend near to, but do not extend to, the free end of the insert 1. The serrations 5 may be embossments, i.e. they may protrude from the surface of the insert 1. The serrations 5 cooperate with a generally M-shaped spring 6 to effect the form-locking. The ends 6d of the feet of the M-shaped spring 6 are bent inward. The spring 6 is received in a radially-arranged slot 6b formed in the fastening clip 2, with the inwardly bent feet 6d of the spring 6 holding the spring in place. The inwardly deformed middle part 6c of the spring 6 resiliently engages the serrations 5 when the insert 1 is inserted into aperture 4. As can be seen in FIG. 2, the fastening clip 2 is accommodated in a known manner in an opening in a wall 7 of the body to which the insert 1 is to be attached, and is secured against being pulled out of or rotated in the opening.

FIG. 2 also shows part of a molded body 8 which is secured to insert 1 which is to be attached to wall 7 by means of insert 1. Molded body 8 in general comprises padding, and may for example be made of foam. Body 8 may be one end of an armrest or of a hand grip.

The connection of the insert 1 and attachment clip 2 with each other is effected by inserting the insert 1 into the aperture 4 with the insert 1 so oriented relative to the arcuate aperture 4 that the spring 6 does not engage the serrations 5 as the insert 1 is inserted. The insert 1 is then rotated to bring the spring 6 and the serrations 5 into locking engagement with each other. When the insert 1 has been so rotated, the middle portion 6c of the spring 6 protrudes into the aperture 4 (see FIG. 2) and engages the serrations 5 formed on the insert 1. The depth of insertion can be selected and adjusted, since the connection remains secure as long as the spring 6 engages some portion of the dentate structure 3. The insert 1 can be detached by rotating the insert 1 about its axis, i.e. by moving it around the arcuate aperture 4, until it has been rotated sufficiently far to disengage the serrations 5 from the spring 6. Then the insert can be simply drawn out of the aperture 4 and the clip 2.

The attachment device in accordance with the invention is for effecting a detachable connection. Accordingly, it is used only for one end of an armrest or of a hand grip. The other end of the armrest or hand grip is secured to the wall 7 by other, conventional means to prevent unintentional rotation of the insert 1 in aperture 4.

The free end of insert 1, or more precisely the portion thereof extending beyond wings 11 and adapted to be received in aperture 4, is preferably made longer than is usually necessary in order to ensure that it can be inserted to any depth that is likely to be required. This development further increases the safety of passengers in a vehicle containing armrests, etc. that are mounted by means of the device of the invention. In case of an accidental impact against an armrest or hand grip which is so mounted, the padding-like molded body 8 yields to the impact and the armrest, etc. shifts itself closer to the wall 7. The resulting noticeable reduction in the crown height of protruding installation parts can prevent the bruises and broken bones that might otherwise occur.

Figure 3:
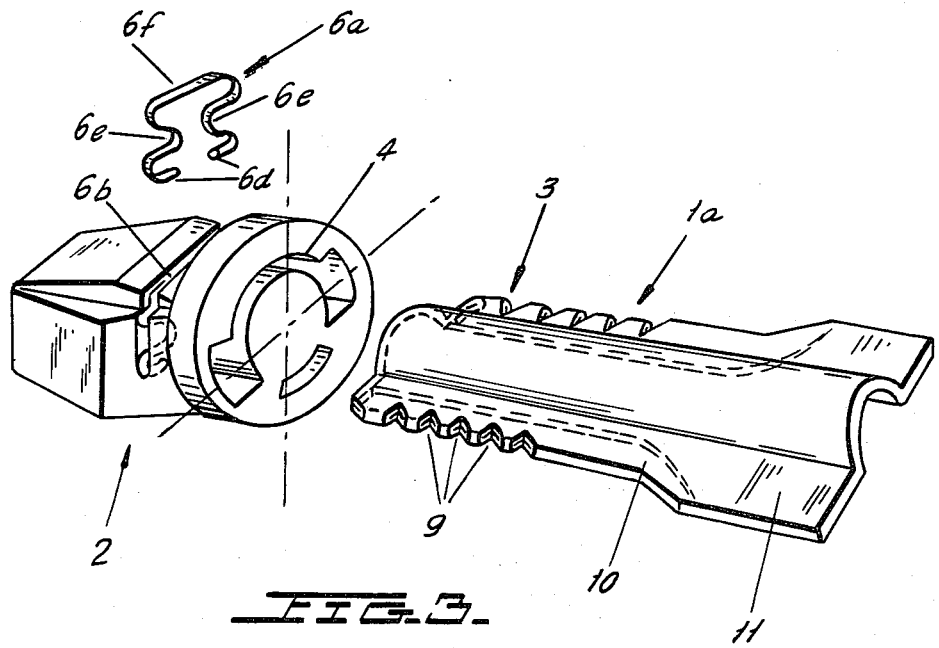
FIGS. 3 and 4 show exploded views of further embodiments of the attachment device of the invention.

The embodiment of FIG. 3 differs only slightly from that of FIGS. 1 and 2. In the insert 1a of FIG. 3, wings 11 have portions 10 which extend to the free end of the insert 1a. The dentate structure 3 comprises teeth 9 formed in wing portions 10, rather than the serrations 5 of the embodiments of FIGS. 1 and 2. In order to obtain the widest possible load-bearing application surface, the wing portions 10 nearest the free end of insert 1a are preferably made twice as thick as the main part of wings 11. This can be done by folding the edge of each wing 11 under in the region starting at the end of the insert 1a to form wing portions 10. The spring 6a is also different from the spring 6 of FIGS. 1 and 2 in having a flat top 6f and two generally M-shaped indented legs 6e for engaging the teeth 9 laterally.

Figure 4:
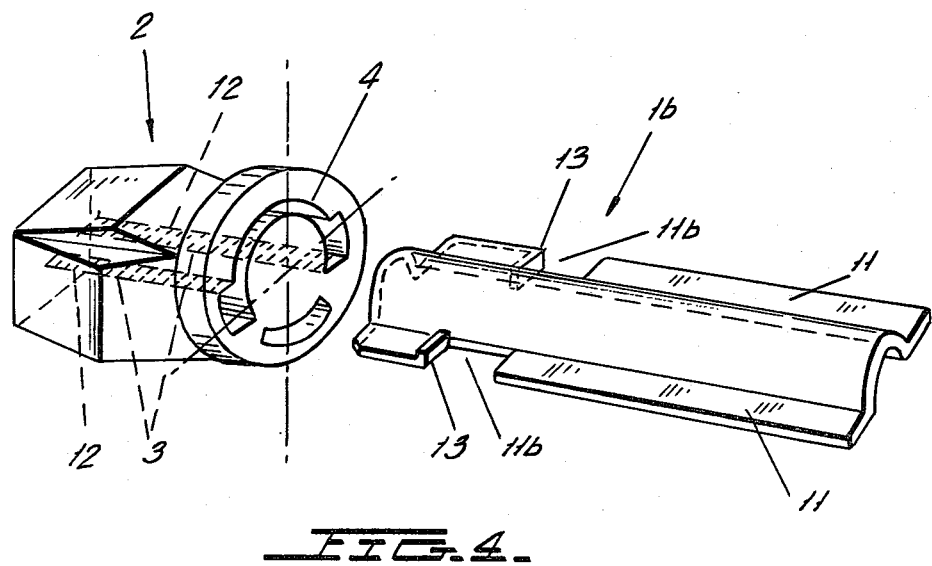

FIG. 4 shows another embodiment of the attachment device of the invention having a dentate locking structure. In this embodiment, the dentate structure includes two sets of teeth 12 which are arranged inside the attachment clip 2, extending rearwardly therethrough from each end of the aperture 4, respectively. Side wings 11 are provided along the longitudinal edges of the insert 1b. In the embodiment shown in FIG. 4, each side wing 11 has a gap 11b therein at a location near, but not at, the free end of the insert 11b. The insert 1b is provided with a single projection 13 on each side. Each projection 13 extends perpendicular to one side wing 11 at the edge of the gap 11b nearer to the free end of the insert 1b. Either both projections 13 extend from wings 11 clockwise or both extend counterclockwise, as seen along the axis of the insert 1b. The illustrated projections 13 both extend clockwise. Therefore, the respective sets of teeth are at the clockwise sides of the opposite wide end portions of the aperture 4. As a result, projections 13 engage the sets of teeth 12 and lock therewith upon rotation of insert 1b in one direction. The projections 13 can be unlocked by rotation of insert 1b in the opposite direction.

The present invention may be embodied in other specific forms without departing from the spirit or essential attributes thereof, and, accordingly, reference should be made to the appended claims, rather than to the foregoing specification, as indicating the scope of the invention.

What is claimed is:

1. An attachment device for attaching an object to a base surface, comprising:

the object having an insert that is to be secured to the base surface; said insert having a longitudinal axis and a cross-section comprising a circular arc;

an attachment clip for being secured to the base surface; said attachment clip having an aperture formed therein and shaped for receiving said insert; said insert being rotatable in said aperture between a first and a second rotational position; and means for detachably securing said insert in said aperture, said securing means comprising a dentate structure on one of said insert and said attachment clip and locking means disposed on the other of said insert and said attachment clip for engaging said dentate structure; said dentate structure comprising a plurality of serrations arranged one behind the other in the direction of said longitudinal axis; said dentate structure and said locking means being so disposed as to engage each other to lock said insert in said aperture at any one of a plurality of insertion depths, each said depth corresponding to an engagement of said locking means and one of said plurality of serrations; at any insertion depth, said engagement occurring when said insert is in said first rotational position, and said dentate structure and said locking means being further disposed as not to engage each other when said insert is in said second rotational position, whereby said insert can be inserted into or drawn from said aperture when said insert is in said second rotational position.

2. The device of claim 1, wherein said insert has an inner surface on the interior of said arc thereof and an outer surface on the exterior of said arc thereof, and wherein the portion of said attachment clip defining said aperture is shaped for engaging said outer surface.

3. The device of claim 2, wherein said attachment clip portion is also shaped for engaging said inner surface.

4. The device of claim 3, wherein said portion of said attachment clip which is shaped for engaging said inner surface comprises a plug, said attachment clip further comprising walls securing said plug to the remainder of said attachment clip.

5. The device of claim 1, wherein said dentate structure is disposed on said insert.

6. The device of claim 5, wherein said insert has an outer surface, and wherein said plurality of serrations is disposed on said outer surface.

7. The device of claim 6, wherein each said serration is an embossment formed on said outer surface.

8. The device of either of claims 1 or 5, wherein said insert comprises a longitudinal segment of a tube.

9. The device of claim 8, wherein said segment has an axis and has longitudinal edges extending parallel to said axis, and further has side wings extending generally radially of said segment from respective said longitudinal edges.

10. The device of claim 9, wherein said side wings have lateral edges generally parallel to said axis, and wherein said dentate structure comprises teeth formed in said side wings along said lateral edges thereof.

11. The device of claim 10, wherein each said side wing comprises two layers of material which are continuous and integral with each other at said lateral edge of the respective said side wing.

12. The device of claim 5, wherein said locking means comprises a locking spring which is normally self biased to engage said dentate structure.

13. The device of claim 12, wherein said attachment clip has a slot formed therein, said slot receiving said locking spring.

14. The device of claim 13, wherein said slot communicates with said aperture, said locking spring being for engaging said insert via said slot and said aperture.

15. The device of claim 14, wherein said locking spring has an indented portion for engaging said dentate structure.

16. The device of claim 1, wherein said dentate structure is disposed in said aperture of said attachment clip.

17. The device of claim 16, wherein said dentate structure comprises a plurality of teeth formed in said aperture.

18. The device of claim 17, wherein said locking means comprises a projection disposed on said insert for engaging said dentate structure.

19. The device of claim 18, wherein said insert comprises a longitudinal segment of a tube.

20. The device of claim 19, wherein said insert has an axis and has longitudinal edges extending parallel to said axis, and further has side wings extending generally radially of said insert from respective said longitudinal edges.

21. The device of claim 20, wherein said projection is disposed on one said side wing.

22. The device of claim 1, wherein said object is an armrest.

23. The device of claim 1, wherein said object is a hand grip.

24. The device of claim 1 wherein said insert is insertable and removable from said aperture by movement solely in the direction of said longitudinal axis when it is in said second rotational position.

* * * * *